(12) United States Patent
Shibata et al.

(10) Patent No.: US 9,327,269 B2
(45) Date of Patent: May 3, 2016

(54) STATIONARY PHASE

(71) Applicant: DAICEL CORPORATION, Osaki-shi, Osaka (JP)

(72) Inventors: Toru Shibata, Himeji (JP); Satoshi Shinkura, Himeji (JP)

(73) Assignee: DAICEL CORPORATION, Osaka-shi, Osaka (JP)

( * ) Notice: Subject to any disclaimer, the term of this patent is extended or adjusted under 35 U.S.C. 154(b) by 0 days.

(21) Appl. No.: 14/416,381

(22) PCT Filed: Jul. 8, 2013

(86) PCT No.: PCT/JP2013/068603
§ 371 (c)(1),
(2) Date: Jan. 22, 2015

(87) PCT Pub. No.: WO2014/017280
PCT Pub. Date: Jan. 30, 2014

(65) Prior Publication Data
US 2015/0182943 A1 Jul. 2, 2015

(30) Foreign Application Priority Data
Jul. 23, 2012 (JP) ................................. 2012-162518

(51) Int. Cl.
| | | |
|---|---|---|
| *B01J 20/285* | (2006.01) | |
| *B01D 15/40* | (2006.01) | |
| *B01J 20/26* | (2006.01) | |
| *B01J 20/286* | (2006.01) | |
| *B01J 20/32* | (2006.01) | |
| *B01J 20/28* | (2006.01) | |
| *C08G 63/00* | (2006.01) | |
| *C08G 63/183* | (2006.01) | |
| *C08G 63/02* | (2006.01) | |

(52) U.S. Cl.
CPC ............ *B01J 20/285* (2013.01); *B01D 15/40* (2013.01); *B01J 20/262* (2013.01); *B01J 20/264* (2013.01); *B01J 20/286* (2013.01); *B01J 20/28016* (2013.01); *B01J 20/28059* (2013.01); *B01J 20/28061* (2013.01); *B01J 20/28064* (2013.01); *B01J 20/3204* (2013.01); *B01J 20/3272* (2013.01); *C08G 63/00* (2013.01); *C08G 63/183* (2013.01); *B01J 2220/80* (2013.01)

(58) Field of Classification Search
USPC ......................................................... 528/176
See application file for complete search history.

(56) References Cited

U.S. PATENT DOCUMENTS

| | | | |
|---|---|---|---|
| 2002/0187557 A1* | 12/2002 | Hobbs ................. | G01N 30/16 436/161 |
| 2008/0078974 A1 | 4/2008 | Tamori et al. | |
| 2011/0028682 A1* | 2/2011 | Odaka et al. ................. | 528/405 |
| 2011/0247981 A1 | 10/2011 | Ono et al. | |

FOREIGN PATENT DOCUMENTS

| | | |
|---|---|---|
| JP | S51-107346 | 9/1976 |
| JP | 2002-506426 A | 2/2002 |
| JP | 3858509 B2 | 9/2006 |
| JP | 2008-081647 A | 4/2008 |
| JP | 2010-137207 A | 6/2010 |
| WO | WO 98/48913 | 11/1998 |

OTHER PUBLICATIONS

Ogden, S. 2013. High-Pressure Microfluidics. Acta Universitatis Upsaliensis. Digital Comprehensive Summaries of Uppsala Dissertations from the Faculty of Science and Technology 1085. 53 pp. Uppsala. ISBN 978-91-554-8773-7.*
International Search Report for PCT/JP2013/068603 (1 page).
*Orthogonal screening system of columns for supercritical fluid chromatography*, by C. West et al, Journal of Chromatography A, vol. 1203, 2008, pp. 105-113.
*A unified classification of stationary phases for packed column supercritical fluid chromatography*, by C. West et al, Journal of Chromatography A, vol. 1191, 2008, pp. 21-39.
*Optical Resolution by Supercritical Fluid Chromatography Using Polysaccharide Derivatives as Chiral Stationary Phases*, by Y. Kaida et al, Bull. Chem. Soc. Japan, vol. 65, 1992, pp. 2286-2288.
*Use of polymer fiber stationary phases for liquid chromatography separations: Part I—physical and chemical rationale*, by R. Marcus, J. Separation Science, vol. 31, 2008, pp. 1923-1935.
*Capillary-channeled polymer fibers as stationary phases in liquid chromatography separations*, by R. Marcus et al, Journal of Chromatography A, vol. 986, 2003, pp. 17-31.
English translation of the European Search Report issued in Application No. 13 82 2750, date of mailing Jun. 5, 2015 (6 pages).
English translation of International Preliminary Report on Patentability and Written Opinion of the International Searching Authority for PCT/JP2013/068603 (6 pages).
The European Search Report issued in Application No. 13 82 2750, date of mailing Jun. 5, 2015 (6 pages).

* cited by examiner

Primary Examiner — Terressa Boykin
(74) Attorney, Agent, or Firm — Flynn, Thiel, Boutell & Tanis, P.C.

(57) ABSTRACT

A stationary phase that increases the number of column stages and that exhibits an excellent molecular discrimination ability is realized by a stationary phase that contains a polymer having, in main chain repeat units, an aromatic ring that forms a portion of the main chain and a bipolar atomic group that forms a portion of the main chain, wherein the stationary phase has a specific surface area of 5 to 1000 $m^2/g$.

8 Claims, 7 Drawing Sheets

STATIONARY PHASE

TECHNICAL FIELD

The present invention relates to chromatographic technology. The present invention more particularly relates to a stationary phase for use in chromatography.

BACKGROUND ART

Chromatography is the most effective means among methods for the analysis of the components of a mixture and their contents and for their separation and purification. Chromatography performs the separation of different substances by utilizing the substance-specific distribution ratio (also understood as the adsorption equilibrium) between a porous solid (the stationary phase) that is spatially immobilized in a column or a tube known as a capillary, and a fluid (the moving phase) that moves in the spaces in the porous solid. Gas chromatography and liquid chromatography are typical here. A gas is used as the moving phase in the former.

However, in order for a separation target to move mixed in a gas phase, at least a certain vapor pressure must be exhibited, and as a consequence only a relatively limited range of analytes, i.e., that have a low molecular weight and that lack charge, can be employed. Liquid chromatography, on the other hand, uses a liquid as the moving phase and can be applied to most substances assuming the selection of a suitable moving phase. Still, since liquids generally have high viscosities, limits are imposed by the increase in the viscous resistance when the generation of excellent separation is sought using a long column or capillary.

Supercritical fluid chromatography (SFC) was invented as a technology that can overcome the shortcomings of both gas chromatography and liquid chromatography. Supercritical fluid chromatography utilizes the characteristics of a supercritical or subcritical fluid, i.e., it dissolves other compounds much better than a gas and has a lower viscosity and a higher diffusion rate than a liquid. SFC using carbon dioxide as the supercritical fluid is generally employed based on safety and device considerations, and its use is gradually becoming more widespread. In addition to SFC, chromatography that uses electrical attraction and so-called thin-layer chromatography (a variant of liquid chromatography), in which paper or particles are consolidated in a thin layer, are available, but their range of application is not very broad.

The typical modes for liquid chromatography are normal-phase chromatography, which uses the combination of a high-polarity stationary phase and a low-polarity stationary phase, and reversed-phase chromatography, in which these polarities are reversed. HILIC, in which both phases are polar, has also been receiving attention quite recently. In addition, chromatographies based on specific interactions are also known, such as ligand-exchange chromatography, which utilizes metal ion/ligand interactions, and affinity chromatography, which utilizes biochemical interactions. Their characteristics and separation mechanisms are generally understood, and their technical advances mainly concern improvements in particle shape in order to improve the separation efficiency.

In contrast, the characteristics of supercritical fluid chromatography (SFC) are reported to be similar to those of normal-phase chromatography. However, many aspects of its characteristics and mechanisms are still not well understood.

The stationary phases used in conventional liquid chromatography (HPLC) have generally been also utilized as the stationary phase (also referred to as the column packing) in SFC. For example, as introduced in Nonpatent Document 1, these are silica gels or silica gels that have undergone surface modification with various atomic groups.

The modifying group may contain a saturated alkyl chain in various chain lengths; or may be a modifying group in which a condensed polycyclic aromatic hydrocarbon group or one or two benzene rings are bonded via an alkyl chain or an alkyl chain that includes the amide bond or ether linkage; or a modifying group in which the characteristic feature is a halogen-substituted benzene ring; or a modifying group in which a halogenated alkyl group is bonded; or a modifying group in which a polar group, e.g., the 2,3-dihydroxypropyl group, CN group, or $NH_2$ group is bonded; or may be a high molecular weight modifying group in the form of crosslinked polystyrene, polyvinyl alcohol, or polyethylene glycol. In addition, carbon having a graphite structure is also a special stationary phase. Among these, (2-pyridyl)ethyl group-bonded stationary phases, referred to as 2-ethylpyridine, in particular are frequently used in SFC; their use is preferred because they provide sharp peak elution even for basic compounds, which undergo tailing and give broad peaks with ordinary stationary phases.

However, as nonetheless indicated in Nonpatent Document 2, the retention trends for various compounds are similar and not a few stationary phases also exhibit no difference in characteristics. It is within this context that the present inventors, recognizing that the ability to discriminate among molecules having similar structures is a necessary condition, have diligently pursued the development of SFC stationary phases.

On the other hand, polysaccharide-type stationary phases for chiral separation are also used in SFC and are utilized in chiral separations in practice (for example, Nonpatent Document 3). Polysaccharide derivatives are also provided with an excellent capacity to distinguish molecular structures outside of chiral separations, but can be difficult to use, because their selectivity range is too large and the separation of optical isomers becomes entangled.

The present inventors have carried out focused investigations thinking that polymers might have a still-to-be-elucidated specific capacity to discriminate molecules. In relation to polymers provided with such a structure, for example, polyesters, there have been attempts to carry out HPLC using fiber-filled columns, and fibers such as PP, PET, nylon-6, Kevlar (trademark) (polyamide), and cellulose have been disclosed as adsorbents (Nonpatent Document 4 and the references cited therein). However, while these are garnering interest, as seen on page 25 of Nonpatent Document 5, they provide broad peaks in actual chromatography and are not practically usable. In addition, the use of a so-called vinyl polymer, e.g., a divinylbenzene/styrene copolymer and so forth, as packing is disclosed in Patent Document 1.

Patent Document 2 discloses polystyrene beads for polynucleotide separation by liquid chromatography and also provides polyesters as an example thereof. However, when a nonporous spherical body, such as that disclosed in Patent Document 2, is used as a chromatographic stationary phase, retention may occur with relatively strongly polar polymers, such as the polynucleotides that are the separation target in the cited invention, while ordinary low molecular weight compounds cannot be retained—or strong tailing is produced even when retention does occur—and a practical analytical method is thus not obtained. This, which may also be said of the fibrous polymer cited above, is due in the case of a thick nonporous polymer to the time required for the separation target to achieve adsorption equilibrium between the solid phase (the polymer used as the adsorbent) and the liquid phase (the moving phase) since the retention of a low molecular weight compound by a polymer occurs when such a molecule diffuses into the interior of the polymer and the diffusion of molecules within a polymer is generally slow.

Patent Document 1 Japanese Patent No. 3,858,509
Patent Document 2 Japanese Translation of PCT Application No. 2002-506426
Non-patent Document 1 C. West et al., J. Chromatogr. A, 1203(2008) 105
Non-patent Document 2 C. West et al., J. Chromatogr. A, 1191(2008) 21
Non-patent Document 3 Y. Kaida et al., Bull. Chem. Soc. Jpn., 65, 2286(1992)
Non-patent Document 4 R. K. Marcus, J. Separation Science, 31, 1923(2008)
Non-patent Document 5 R. K. Marcus et al., J. Chromatogr. A, 986, 17(2003)

DISCLOSURE OF THE INVENTION

The present invention solves the problems identified above and has as an object the introduction of a stationary phase that increases the number of column stages and that exhibits an excellent molecular discrimination ability.

As a result of intensive and extensive investigations in order to achieve this object, the present inventors discovered that the number of column stages can be increased and an excellent molecular discrimination ability can be realized by a stationary phase that contains a polymer having in the main chain repeat units an aromatic ring that forms a portion of the main chain and a bipolar atomic group that forms a portion of the main chain, wherein the stationary phase has a specific surface area of 5 to 1000 $m^2/g$. The present invention was achieved based on this discovery.

That is, the present invention is as follows.

(1) A stationary phase containing a polymer that has, in main chain repeat units, an aromatic ring that forms a portion of the main chain and a bipolar atomic group that forms a portion of the main chain, wherein the stationary phase has a specific surface area of 5 to 1000 $m^2/g$.

(2) The stationary phase according to (1), wherein the polymer is a polyester, a polysulfone, a polyethersulfone, or a polycarbonate.

(3) The stationary phase according to (2), wherein the polymer is a polyester.

(4) The stationary phase according to (3), wherein the polyester is polyethylene terephthalate (PET), polybutylene terephthalate (PBT), polyethylene isophthalate, poly(2,2-dimethylpropan-1,3-diyl terephthalate), or poly-4-oxymethylbenzoyl.

(5) The stationary phase according to any of (1) to (4), wherein the polymer is supported on a carrier that has a specific surface area of 5 to 1000 $m^2/g$.

(6) The stationary phase according to any of (1) to (5), which is a particulate.

(7) The stationary phase according to (6), wherein the average particle diameter is 0.1 μm to 1000 μm.

(8) The stationary phase according to any of (1) to (5), which is a monolith.

(9) The stationary phase according to any of (1) to (8), which is for supercritical fluid chromatography.

Advantageous Effects of Invention

The present invention can provide a stationary phase that increases the number of column stages and that has an excellent molecular discrimination ability.

DESCRIPTION OF EMBODIMENTS

Figure 1:
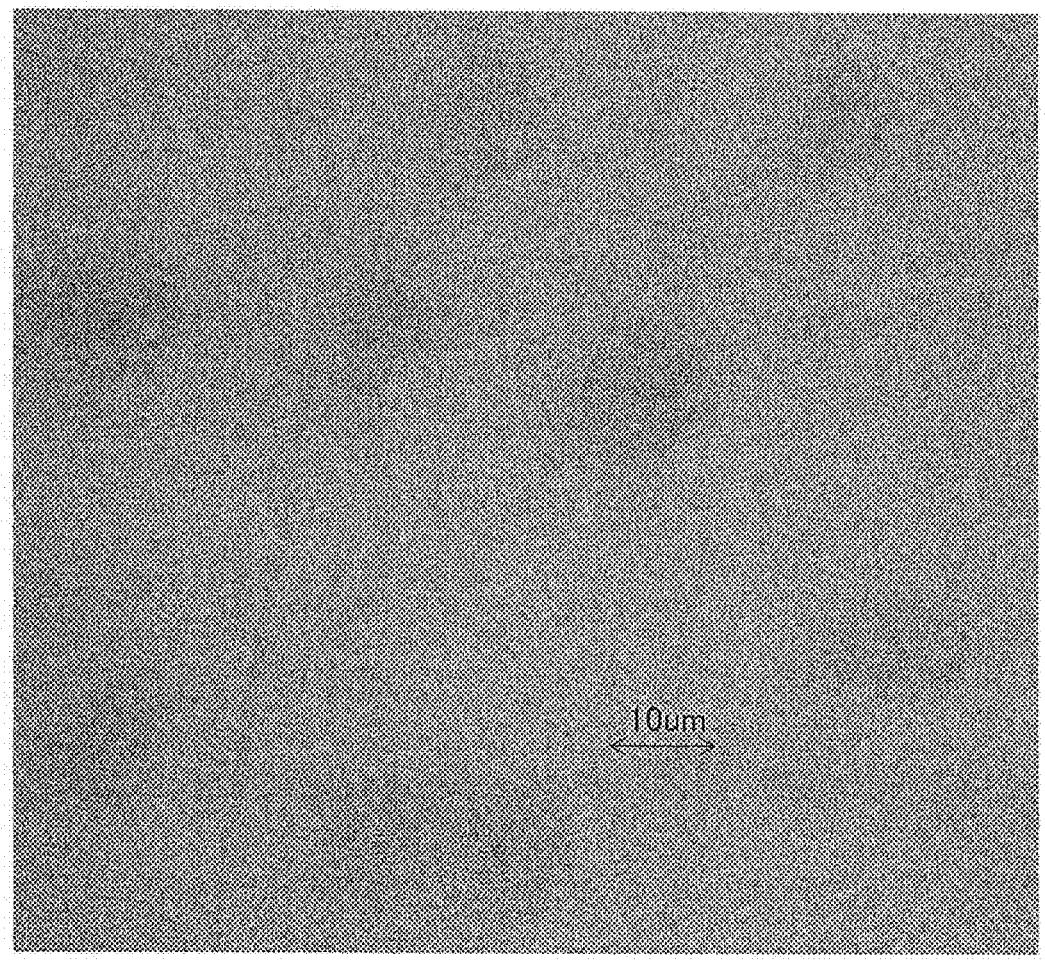
FIG. 1 is a photomicrograph (photograph in lieu of drawing) of a silica gel (pore diameter=120 Å) that has been treated with aminopropylsilane.

The present invention is a stationary phase that contains a polymer that has in the main chain repeat units an aromatic ring that forms a portion of the main chain and a bipolar atomic group that forms a portion of the main chain, wherein its specific surface area is 5 to 1000 $m^2/g$.

Here, the stationary phase denotes a material in a chromatographic method that is fixed within an analytical tool (a column or a capillary) and that contributes to separation through the partitioning of the substance to be separated between the stationary phase and a fluid that is moving while in contact with the stationary phase. When the stationary phase is a particulate, the stationary phase also denotes the aggregate formed by the packing of these particles as well as the individual particles themselves.

<The Polymer>

The stationary phase of the present invention contains a polymer that has in the main chain repeat units an aromatic ring that forms a portion of the main chain and a bipolar atomic group that forms a portion of the main chain.

Here, "aromatic ring that forms a portion of the main chain" means that this aromatic ring forms a structural element of the main chain of the polymer. Stated differently, this means that this aromatic ring has at least two substituents, and tracing along one of them leads to one terminal of the polymer and tracing along the other leads to the other terminal of the polymer.

This aromatic ring includes benzene; condensed cyclic aromatic hydrocarbons such as naphthalene, phenanthrene, and pyrene; heterocyclic aromatic hydrocarbons such as thiophene and pyrrole; and selections from those in which a plurality of rings are connected by a single bond such as biphenyl. The positions of the two substituents are not limited, but the substitution patterns in the case of benzene can be exemplified by the 1,2-positions, 1,3-positions, and 1,4-positions; the substitution patterns in the case of naphthalene can be exemplified by the 1,4-positions, 1,5-positions, 2,5-positions, 2,6-positions, and 2,7-positions; and the substitution patterns in the case of biphenyl can be exemplified by the 4,4'-positions and the 3,3'-positions. The aromatic ring is preferably benzene, naphthalene, or biphenyl.

The aromatic ring may have a substituent other than the polymer main chain, and this substituent can be exemplified by $C_{1-12}$ alkyl, C1-12 alkoxy, cyano, halogen, hydroxy, amino, nitro, and so forth. Substitution by the methyl group or a halogen atom (F, Cl, Br, I) is preferred because there is little direct interaction for these substituents themselves and this substitution can influence the molecular discrimination of the polymer.

The polymer used in the present invention contains a bipolar atomic group that forms a portion of the main chain. This bipolar atomic group that forms a portion of the main chain has, for example, a structure with the following formula.

[C1]

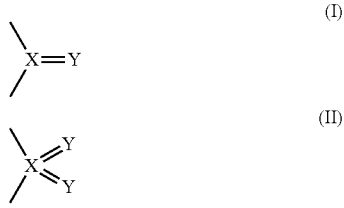

With reference to the bipolar atomic group that forms a portion of the main chain, the meaning here is that both of the two valences on X in formula (I) or (II) that are not assigned a bonding partner are structural elements of the main chain of the polymer. Stated differently, this means that tracing along one of them leads to one terminal of the polymer and tracing along the other leads to the other terminal of the polymer.

In specific terms, when X is carbon, Y is oxygen (carbonyl group), sulfur (thiocarbonyl group), or nitrogen bearing one substituent (including oximes and hydrazones); when X is sulfur, Y is oxygen (sulfoxide, sulfone) or nitrogen bearing one substituent (sulfilimine, sulfoximine); and when X is phosphorus bearing one substituent, Y is oxygen or nitrogen bearing one substituent. Among these bipolar atomic groups, the carbonyl group, sulfoxide, and sulfone are preferred.

With regard to the content of the bipolar atomic group, generally 1 to 3 and preferably 1 to 2 bipolar atomic groups are contained in 1 unit of the repeat units making up the polymer. This "repeat units making up the polymer" denotes the single monomer unit when the polymer is obtained by the polymerization of a single species of monomer and, when the polymer is obtained by the polymerization of two or more species of monomers, denotes, for example, the terephthalic acid/ethylene glycol dimer in the case of polyethylene terephthalate.

The content in the present invention of the repeat units containing the aromatic ring and bipolar atomic group in the repeat units making up the polymer is generally 70 to 100 mol % and is preferably 90 to 100 mol % (not considering the terminals).

This polymer can be specifically exemplified by polyesters such as polyethylene terephthalate (PET), polybutylene terephthalate (PBT), polyethylene isophthalate, poly(2,2-dimethylpropan-1,3-diyl terephthalate), polyarylate, and poly-4-oxymethylbenzoyl, as well as by polysulfone (PS), polyethersulfone (PES), polycarbonate (PC), and polyetheretherketone (PEEK). In order to provide a good number of column stages as a column packing, the molecular main chain generally preferably has a high-mobility substructure such as —$CH_2$—$CH_2$—.

When the polymer used in the present invention is a polyester, its synthesis may be carried out, for example, by a dehydration condensation between a carboxylic acid and an alcohol or phenol, or transesterification with an ester, or reaction with an acid halide. With regard to the monomer used in the synthesis, for example, terephthalic acid, phthalic acid, isophthalic acid, 2,6-naphthalenedicarboxylic acid, 2,7-naphthalenedicarboxylic acid, the preceding substituted by the methyl group or a halogen atom on the aromatic ring, and their esters and halides can be used as the dicarboxylic acid, while for example, ethylene glycol, diethylene glycol, triethylene glycol, polyethylene glycol, propylene glycol, 1,3-propanediol, 2,2-dimethylpropane-1,3-diol, 1,4-butanediol, 1,4-cyclohexanedimethanol, and 1,4-cyclohexanediol can be used as the diol component. An aromatic compound having a carboxylic acid or residue thereof and an alcohol or phenol in the molecule, for example, 4-hydroxymethylbenzoic acid and its esters, may also be used as a single monomer. However, the "polyester" described in Japanese Patent No. 3,858,509, which is a vinyl polymer having ester side chains, is not a polyester in the general sense or for the purposes of the present invention.

In the case of the polyester, the aromatic ring that forms a portion of the main chain is preferably 1,4-benzene, 1,3-benzene, 1,6-naphthalene, 1,7-naphthalene, or 1,5-thiophene. A peak broadening trend generally appears in chromatography when this ring is too large. Also in the case of the polyester, the bipolar atomic group that forms a portion of the main chain is preferably C=O (carbonyl), S=O (sulfoxide), or S(=O)$_2$ (sulfone) considering the chemical stability and a suitable bipolarity, while the presence of 1 to 2 bipolar atomic groups in 1 unit of the repeat units making up the polymer is preferred from the standpoint of the ease of synthesis. Also in the case of the polyester, the presence in the repeat units of a high-mobility substructure, e.g., —$CH_2$—$CH_2$— and so forth, is preferred in order to provide a good number of column stages as a column packing.

Among the preceding, condensation polymers that use terephthalic acid or isophthalic acid as the carboxylic acid and ethylene glycol, propylene glycol, butylene glycol, or 2,2-dimethylpropane-1,3-diol as the dihydric alcohol, and poly-4-oxymethylbenzoyl, which is provided by the condensation of 4-hydroxymethylbenzoic acid or methyl 4-hydroxymethylbenzoate, are easily obtained and hence are preferred. In particular, PET, which is the condensation polymer from terephthalic acid and ethylene glycol, and PBT, which is the condensation polymer from terephthalic acid and butylene glycol, are produced industrially and thus offer the advantage of ease of acquisition.

The weight-average molecular weight of the polyester under consideration is 1,000 to 5,000,000 and is preferably 5,000 to 1,000,000. This range is preferred considering, for example, the solvent solubility of the polymer, prevention of particle aggregation when the polymer is supported on a carrier, inhibition of dissolution in the moving phase solvent, and maintaining the amount of bonding in the case of chemical bonding to a carrier. The optimal point will vary as a function of the type of polymer. The weight-average molecular weight can be measured by gel permeation chromatography (GPC) using polystyrene as the standard substance.

When the polymer used in the present invention is a polycarbonate, the synthesis method can be, for example, an interfacial method in which a bisphenol is directly reacted with phosgene, or a transesterification method in which a bisphenol is reacted with diphenyl carbonate under solventless conditions.

The bisphenols can be exemplified by 2,2-bis(4-hydroxyphenyl)propane (=bisphenol A), 2,2-bis(3,5-dibromo-4-hydroxyphenyl)propane, 2,2-bis(3,5-dimethyl-4-hydroxyphenyl)propane, 1,1-bis(4-hydroxyphenyl)cyclohexane, 1,1-bis(4-hydroxyphenyl)decane, 1,4-bis(4-hydroxyphenyl)propane, 1,1-bis(4-hydroxyphenyl)cyclododecane, 4,4'-dihydroxydiphenyl ether, 4,4'-dithiophenol, 4,4'-dihydroxy-3,3'-dichlorodiphenyl ether, and 4,4'-dihydroxy-2,5-dihydroxydiphenyl ether.

The weight-average molecular weight of the polycarbonate under consideration is 1,000 to 5,000,000 and is preferably 5,000 to 1,000,000.

When the polymer used in the present invention is a polyethersulfone, a polymer from 4-chloro-4'-hydroxydiphenylsulfone can be provided as a typical example. The weight-average molecular weight of the polyethersulfone is 1,000 to 5,000,000 and is preferably 5,000 to 100,000.

When the polymer used in the present invention is a polysulfone, its weight-average molecular weight is 1,000 to 5,000,000 and is preferably 5,000 to 100,000.

Depending on the production conditions, these polymers may have a strongly polar atomic group, e.g., the carboxyl group, in a terminal position. Such an atomic group frequently causes the chromatographic efficiency to decline through a strong adsorption known as non-specific adsorption. Deactivation by some chemical treatment is thus preferred. For example, the carboxyl group may be converted to the ester, and, for example, diazomethane or trimethylsilyldiazomethane is frequently used for this purpose. Reaction with an amine and a so-called condensation agent, e.g., DCC, may also be performed. Moreover, even if a strongly polar atomic group does remain extant in a terminal position, an excellent chromatogram can be obtained through the addition of a small amount of an ionic additive, for example, an amine, an acid, or their mixture, to the moving phase.

When the developing solvent is a solvent that can natively dissolve the polymer or is a mixed solvent containing such a solvent, all or a portion of the polymer may be dissolved and the functionality as a column will then be impaired. Due to this, the polymer according to the present invention is preferably an insolubilized polymer. The candidate set of applicable developing solvents can be broadened when the polymer has been insolubilized.

Any insolubilization method may be used. For example, insolubilization may be performed by a method in which the polymer is chemically bonded to the surface of a carrier.

Insolubilization can be carried out by bonding the polymer to a reactive atomic group that has been bonded, using a spacer such as a silane coupling agent, to the surface of the carrier, e.g., silica gel. For example, when a polyester is reacted with an amino group-bonded silica gel as provided by treatment with aminopropylsilane, any carbonyl group in the polyester forms the amide and insolubilization is made possible as a result by the bonding of the polymer to the silica gel surface. In addition, it can be expected that an epoxy group-bonded silica gel will bond the polymer by reaction, with terminal carboxylic acid groups in the polyester.

In another method, a substituent capable of bonding to the other party may be introduced into the carrier and/or polymer. For example, a polyethersulfone having a terminal chlorine atom may be insolubilized by bonding to the carrier, e.g., silica gel, by substitution of the chlorine with an amino group. A polyester may be bonded, for example, to a hydroxyl group-bonded silica gel in the presence of a suitable acid catalyst such as a sulfonic acid. On the other hand, a polyethersulfone may also have a phenolic hydroxyl group in a terminal position, and this may be converted to the phenolate with a suitable base, such as an alkoxide, followed by a reaction with a halomethylphenyl group- or epoxy group-bonded silica gel to effect bonding to the silica gel by a substitution reaction and bring about insolubilization. When the polymer is formed by the polymerization of a monomer on the silica gel, the polymer can be bonded on the silica gel by having bonded an atomic group capable of participating in the polymerization to the silica gel surface in advance.

Moreover, the polymer itself can also be insolubilized without creating a chemical bond with the carrier, e.g., silica gel. For example, depending on the type of polymer, and taking PET as an example, insolubilization can be brought about by crystallization by execution of just a heat treatment. Insolubilization may also be brought about by the formation of intermolecular crosslinking of an unspecified structure by exposure to high-energy electromagnetic radiation, e.g., ultraviolet radiation or gamma-radiation, or exposure to particle radiation such as electron radiation.

An insoluble crosslinked polymer can also be made by the addition to the monomer of a suitable amount of a monomer having multiple polymerizable functional groups (for example, the vinyl group, silyl group, and so forth). The reaction that forms the polymer main chain may be different from the crosslinking reaction. For example, one can contemplate the incorporation of a vinyl group-bearing monomer into the polymer of the present invention and then, after polymer formation, carrying out radical polymerization of the vinyl group.

Considered from the standpoint of solubility, the average degree of polymerization of the polymer used in the present invention is at least 5 and is preferably at least 100. With regard to the upper limit, on the other hand, there are no particular limitations since no problems are caused by a high degree of polymerization, but the upper limit is generally not more than 10,000,000. The average degree of polymerization can be measured by GPC.

The average degree of polymerization prior to treatment of the polymer is the relevant value when, as described above, the polymer is chemically bonded or insolubilization is carried out by crystallization through a heat treatment.

On the other hand, the average degree of polymerization is estimated in those instances where the degree of polymerization of the polymer does not fit, such as when the monomer is polymerized on the carrier. In the basic methodology for this, the chemically bonded polymer is assumed to have the same degree of polymerization as the not-chemically-bonded polymer of the polymerizate, and after the polymerization reaction on the carrier, washing is first performed with a solvent that dissolves only low molecular weight material, this is followed by washing with a solvent that dissolves the polymer, and GPC is carried out on the extracted polymer.

The following method can be used in those instances in which even this assumption is problematic: using a reagent that dissolves the carrier under mild conditions (for example, a methanol solution of ammonium hydrogen fluoride when the carrier is silica gel), dissolution is carried out until there are no atomic groups bonded to the carrier surface, the obtained eluate is treated with, for example, hexamethyldisilazane, and the average degree of polymerization is then measured by GPC analysis.

When the preceding methods cannot be used, terminal group analysis is also possible depending on the structure of the polymer terminals. For example, when the terminal is a carboxylic acid, inter alia, acid-base titration or a method in which the amount of bound cation is analyzed after ion exchange can be used. When the terminal is an alcohol, an atomic group containing an indicator element may be introduced by, for example, esterification or carbamoylation, and the amount of introduction of this element may then be analyzed; however, when the silica gel surface has been modified with the amino group, its inactivation is required in advance using an amino group-selective chemical treatment. Here, consideration must be given to the appropriate analytical method as a function of, for example, the bonded polymer and the atomic groups already bonded to its carrier. Once the quantitative value for the terminal groups has been obtained, the molecular weight (degree of polymerization) can be acquired by dividing the estimated bound amount by the number of terminal groups.

<The Stationary Phase>

A porous stationary phase can be made by supporting the polymer on a particulate or monolithic carrier. The polymer can itself be utilized in the form of porous spherical or amorphous particles, a porous single body or so-called monolith having continuous pores, or a porous film. Here, the "porous" referenced for the present invention refers to having a specific surface area for the surface, as measured by the BET method using nitrogen adsorption, of 5 to 1000 $m^2/g$ and preferably 10 to 500 $m^2/g$. A specific surface area for the stationary phase in the indicated range is advantageous for the separation of low molecular weight compounds and is preferred from the standpoint of preventing tailing.

With regard to methods for increasing and reducing the specific surface area of the stationary phase, and considering the case in which the polymer is supported on a carrier, a carrier with the desired specific surface area should be selected since the specific surface area of the stationary phase corresponds to the specific surface area of the carrier used. The carrier, for example, silica gel, can be prepared by selecting suitable products. Considering the case in which the polymer is supported on a carrier, a variation in the specific surface area pre-versus-post-support in excess of the margin of error generally does not occur, and as a consequence the specific surface area of the stationary phase can be considered to be the same as the specific surface area of the carrier used.

When, on the other hand, the polymer is executed as a particulate or monolith, methods for adjusting the specific surface area of the stationary phase can be exemplified, considering the case of suspension polymerization, by raising the specific surface area by the addition as a diluent of an organic solvent that dissolves in the monomer mixture, is inert to the polymerization reaction, and does not dissolve the produced polymer.

Considering the case in the present invention in which the polymer is supported on a carrier, this carrier can be exemplified by porous organic carriers and porous inorganic carriers, wherein porous inorganic carriers are preferred. High molecular weight substances selected from, for example, polystyrenes, poly(meth)acrylamides, and poly(meth)acrylates are suitable porous organic carriers, while suitable porous inorganic carriers are, for example, silica gel, alumina, zirconia, titania, magnesia, glass, kaolin, titanium oxide, silicate, and hydroxyapatite. Silica gel, alumina, and glass are preferred carriers.

The average particle diameter of this carrier is generally 0.1 to 100 μm and is preferably 1 to 50 μm. Its average pore diameter is generally 10 to 10,000 Å and is preferably 50 to 1,000 Å. The specific surface area of the carrier is generally 5 to 1,000 $m^2/g$ and is preferably 10 to 500 $m^2/g$. In those instances in which the polymer is supported on a carrier, the average particle diameter of the stationary phase can be considered to be the same as the average particle diameter of the carrier used since a variation in the specific surface area pre-versus-post-support in excess of the margin of error generally does not occur.

While the carrier as such may be acceptable, a chemical treatment of its surface can suppress excessive adsorption of the separation target to the carrier itself and can facilitate the chemical bonding of the polymer. The chemical treatment can be exemplified by treatment with a silane coupling agent or aminopropylsilane as described for the insolubilization methodologies.

The average thickness of the polymer (amount supported per g of carrier/specific surface area of the carrier) supported on the carrier is generally $2/10^5$ to $2/10^7$ (μm) and is preferably $4/10^5$ to $5/10^7$. A trend toward sharper peaks occurs in the indicated range, which is thus preferred.

The method for supporting the polymer on the particulate or monolithic carrier can be exemplified by methods in which the polymer is dissolved in a solvent, and, after the carrier has been, for example, coated, sprayed, or immersed, the solvent is removed using a reduced pressure or a traversing gas current, leaving the polymer on the carrier surface. The solvent may be selected from suitable solvents capable of dissolving the polymer used, and, for the case of PET, can be exemplified by 1,1,1,3,3,3-hexafluoro-2-propanol, while for the case of a polyethersulfone the solvent can be exemplified by dichloromethane.

In an example of another method, the precursor for the polymer is impregnated into the carrier, along with a suitable catalyst as necessary, and polymerization is then carried out.

Methods in which support on the carrier is effected by chemical bonding are additional examples of the method for supporting the polymer on the particulate or monolithic carrier. The same methods as described above for polymer insolubilization can be used to effect support on the carrier by chemical bonding.

For such a stationary phase in which the polymer is supported on a carrier, the percentage (%) of the mass parts of the polymer present in 100 mass parts of the stationary phase is preferably 1 to 50% and more preferably is 10 to 30%. Observing this percentage makes it possible to avoid peak broadening and an unnecessary strengthening of the retention while bringing about a favorable expression of the adsorptive capacity of the polymer, and hence is preferred.

Suspension polymerization is an example of a method for making the polymer itself into a stationary phase of porous spherical or amorphous particles. In another method, an already prepared solution of the polymer is suspended in a liquid that is immiscible with this solution and the solvent is gradually removed by diffusion, or the polymer is precipitated using a precipitant, or the solution is gelled by changing the temperature. In order to make the polymer porous, it is effective to add in advance in a suitable amount a substance that is not compatible with the polymer but which dissolves in the solvent that is dissolving the polymer, and to wash out and extract this substance after the particles have been solidified. Porosity may also be generated by inducing spinodal decomposition during polymerization or during temperature change-induced gelation.

When the stationary phase of the present invention is a particulate, and considering the case in which the polymer is supported on a carrier, the average particle diameter of the stationary phase is generally 0.1 μm to 1,000 μm and is preferably 1 μm to 100 μm.

When, on the other hand, the polymer is executed as a porous particulate, the average particle diameter of the stationary phase is generally 0.1 μm to 1,000 μm and is preferably 5 μm to 500 μm and is more preferably 10 μm to 200 μm. This range is preferred in terms of the balance between an excellent column efficiency and the fluid permeability of the packing layer.

The average particle diameter refers to the diameter in the case of a spherical shape, but in the case of an amorphous particle represents the diameter of the sphere equal to the volume of the particle. The average particle diameter can be measured using an instrument that performs the measurement using a micrographic image, for example, the Mastersizer 2000E from Malvern.

The range of applications is also broadening for monoliths, which are nonparticulate stationary phases that are a single porous structure having many through pores (continuous pores). In the present invention, a porous monolith can also be made by a phase separation process when the conditions described for the methods for forming porous particles are applied, for example, in a suitable container and without generating a suspended state. In addition, the polymer may also be supported on a carrier that is already in the form of a monolith. The same materials as used for the previously described carriers can be used as the material of a carrier monolith. With a monolith, it is crucial that neither voids nor compacted regions be formed between it and its container (the analytical column), and existing methodologies can be used to accomplish this. Existing monoliths are described in, for example, Japanese Patent Application Laid-open No. H7-041374. This document teaches the production of a monolithic inorganic porous body by a sol-gel method in which metal alkoxide is used as the starting material, favorable auxiliary substances are added to the starting material, and a structure is produced that has a solvent-rich phase that forms very large holes.

In those instances in which the stationary phase of the present invention is used in particulate form, the aspect ratio is not more than 2 and preferably not more than 1.5. Since closer to spherical is better, the lower limit is not particularly limited down to 1.

The aspect ratio may be measured as follows. The sample, having been randomly broadcast on the observation stage, is observed from directly above with an electron microscope or optical microscope; a field is randomly selected in which at least 10 independent (not in contact with or overlapping with any other particle) primary particles are observed; the major axis and minor axis (the length of the longest portion orthogonal to the major axis) is determined for each of the independent primary particles in the field; and the ratio between the two is taken to be the aspect ratio of the individual particle. The arithmetic average of the aspect ratios for all the independent primary particles in the field is made the aspect ratio in the present invention. Here, a primary particle is a particle for which a particle-to-particle interface can be clearly and distinctly observed. The observation is ordinarily carried out with dispersal on the sample stage sufficient to avoid primary particle overlap. However, it is difficult to avoid incidental overlap and, in addition, bulk particles in which a plurality of primary particles are aggregated may also be present, but these are excluded from the observation target.

The stationary phase of the present invention can be used in supercritical fluid chromatography (SFC) and in liquid chromatography such as HPLC and so forth.

The present invention is specifically described in the following with reference to examples. However, the present invention is not limited to or by the features of the following examples.

Production Example 1

Aminopropylsilane Treatment of Silica Gel

Three different silica gels, having an average particle diameter of 5 μm and a pore diameter of 120, 300, or 700 Å, were aminopropylated using the following procedure. 14 g of the silica gel was vacuum dried at 100° C. followed by dispersion in 150 mL of toluene, and a portion of the toluene (approximately 30 mL) was removed by distillation until the cloudiness in the condensate had disappeared. 7 mL of aminopropyltriethoxysilane was added to the silica gel dispersion, and approximately 200 mL was distilled off over 8 hours while making supplementary additions of about 200 mL toluene in suitable aliquots. After the liquid had been cooled, the silica gel was collected on a glass filter and was washed once with 70 mL of toluene and twice with 70 mL of dichloromethane; this was followed by vacuum drying.

A photomicrograph of the obtained silica gel (the silica gel with a pore diameter of 120 Å) is given in FIG. 1. The average of the aspect ratio was about 1.0 for 22 particles photographed on the randomly selected field.

Measurement of the specific surface area of the three silica gels (average pore diameter=120, 300, and 700 Å) by the BET method gave 320 $m^2/g$, 98 $m^2/g$, and 35 $m^2/g$, respectively.

Example 1

3.53 g of the aminopropylsilane-treated silica gel (average particle diameter=5 μm, average pore diameter=300 Å) obtained in Production Example 1 was placed in a flask; a solution of 1.85 g of methyl 4-hydroxymethylbenzoate and 126 mg of toluenesulfonic acid monohydrate dissolved in 1 mL of methanol and 7 mL of dichloromethane was absorbed thereto; and the solvent was removed under a reduced pressure. While reducing the pressure ultimately to 1 Torr, the flask was heated on an oil bath and the temperature was gradually raised from 100° C. and holding was finally carried out for 5 hours at 150° C. After the completion of the heat treatment, the obtained powder was dispersed in 30 mL of methanol to which a solution of 63 mg of ammonium bicarbonate dissolved in water had been added and was recovered by filtration on a glass filter and then washed 4 times with 50 mL of methanol. After drying, the product was washed an additional 3 times with 50 mL of NMP, followed by dispersion in a mixture of 15 mL of methanol and 10 mL of toluene, addition of 0.5 mL of a 10% hexane solution of trimethylsilyldiazomethane, and standing overnight. This was followed by washing with a suitable amount of methanol and vacuum drying.

Approximately 11.4 mass % of poly(4-oxymethylbenzoyl) was estimated to be bonded from the fact that the carbon content of the obtained silica gel was 9.28 mass % and the carbon content of the starting silica gel was 1.3 mass %.

The specific surface area of the obtained poly(4-oxymethylbenzoyl)-bonded silica gel was taken to be 98 $m^2/g$ and its average particle diameter was taken to be 5 μm.

Figure 2:
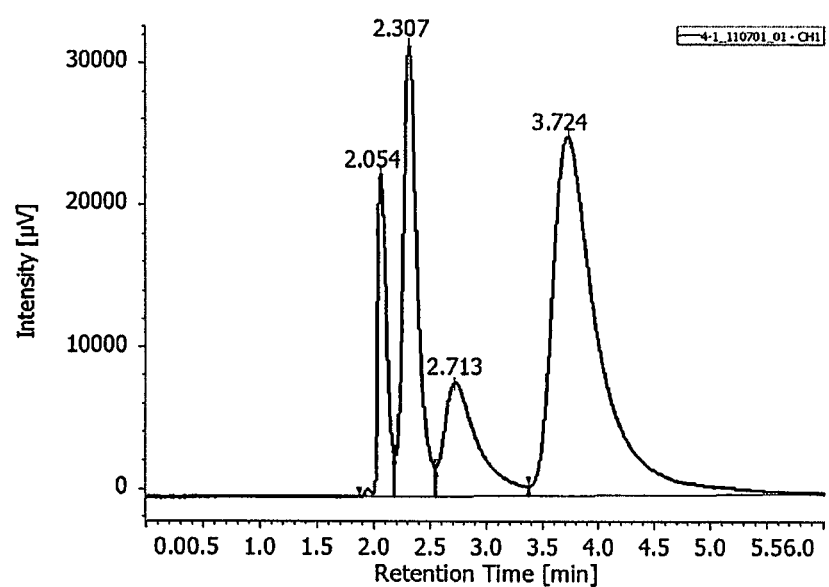
FIG. 2 is a diagram that shows the separation of terphenyl isomers and triphenylene by HPLC on a stationary phase of poly(4-oxymethylbenzoyl)-bonded silica gel.

The obtained poly(4-oxymethylbenzoyl)-bonded silica gel was slurry packed as the stationary phase into a 2.1 mmϕ×150 mm column and terphenyl isomers and triphenylene were separated using liquid chromatographic conditions. The separation of the terphenyl isomers and triphenylene by HPLC on the polyoxymethylbenzoyl stationary phase is shown in FIG. 2. The peak sequence is ortho isomer, meta isomer, para isomer, and triphenylene. The column size was 2.1 mmϕ×150 mm, and the moving phase was 0.21 mL/min of 9:1 v/v hexane/2-propanol.

An NMP wash was performed, and dilution of the wash liquid with water resulted in the separation of a white precipitate; its molecular weight was determined to be Mw=approximately 14,000 (as PS) by GPC (TSKgel GMH from Tosoh Corporation) using a moving phase of NMP containing 0.5% LiCl. It can be assumed that poly(4-oxymethylbenzoyl) with the same molecular weight is also bonded in the obtained poly(4-oxymethylbenzoyl)-bonded silica gel.

Production Example 2

Proceeding as in Production Example 1, the silica gel with a pore diameter of 300 Å was treated with glycidoxypropyltriethoxysilane in place of the aminopropyltriethoxysilane. However, after the addition of the silane treatment agent at this time, the temperature was held at 93° C. and the toluene distillation was not performed. The carbon content in the obtained silica gel was 1.21 mass %.

Example 2

0.80 g of 4-hydroxymethylbenzoic acid and 48.6 mg of p-chlorobenzenesulfonic acid were dissolved in 6.1 mL of THF; 2.4 g of the silica gel obtained in Production Example 2 was mixed thereinto; and the solvent was distilled out under reduced pressure. While continuing the vacuum (5 Torr), the temperature was gradually raised from 100° C. and was brought to 148° C. in 3 hours, and this was held for 2.5 hours. After cooling, 20 mL of methanol containing 200 mg of pyridine was poured in and the silica gel was dispersed and was collected by filtration on a glass filter. The silica gel was additionally washed 5 times using a total of 200 mL of methanol. Dispersal with 40 mL of NMP and collection by filtration was carried out an additional 3 times, followed by washing in succession with 40 mL of acetone, 40 mL of methanol, and 40 mL of an equivolume mixture of hexane/acetone and drying under a vacuum. The carbon content of the obtained silica gel was 6.76 mass %. The polymer content in the product was calculated to be 7.9 mass % from the fact that the carbon content of the silica gel prior to the supporting process was 1.21 mass %. The specific surface area of the obtained stationary phase was taken to be 98 $m^2/g$ and its average particle diameter was taken to be 5 μm.

Figure 3:
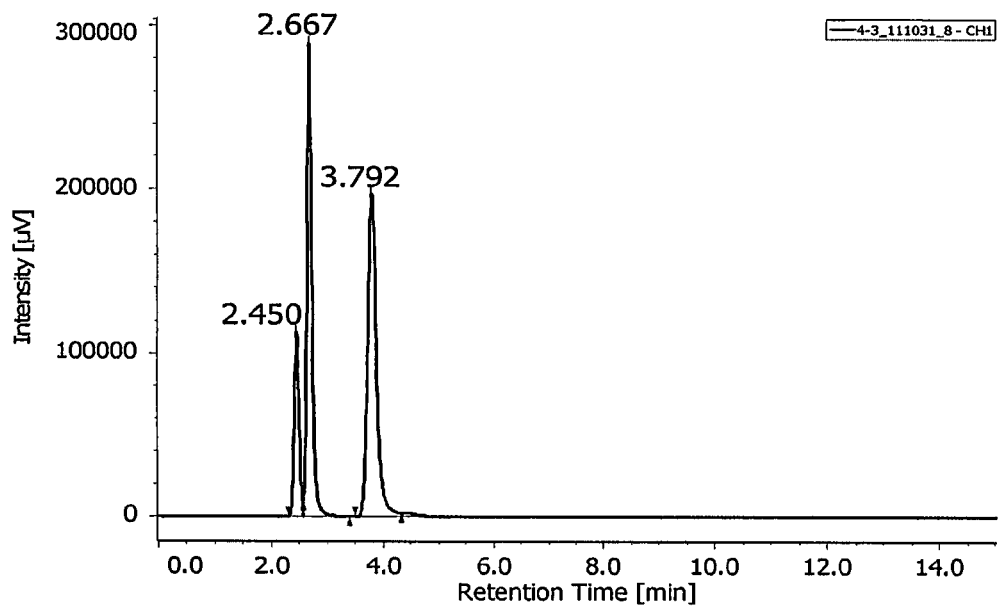
FIG. 3 contains chromatograms obtained using the stationary phase of Example 2, where the upper diagram shows the results for HPLC carried out using the conditions of 25° C. and 1 mL/min hexane/2-propanol (100:1 v/v) and the lower diagram shows the results for SFC carried out with CO2/methanol (97:3 v/v)
Figure 3:
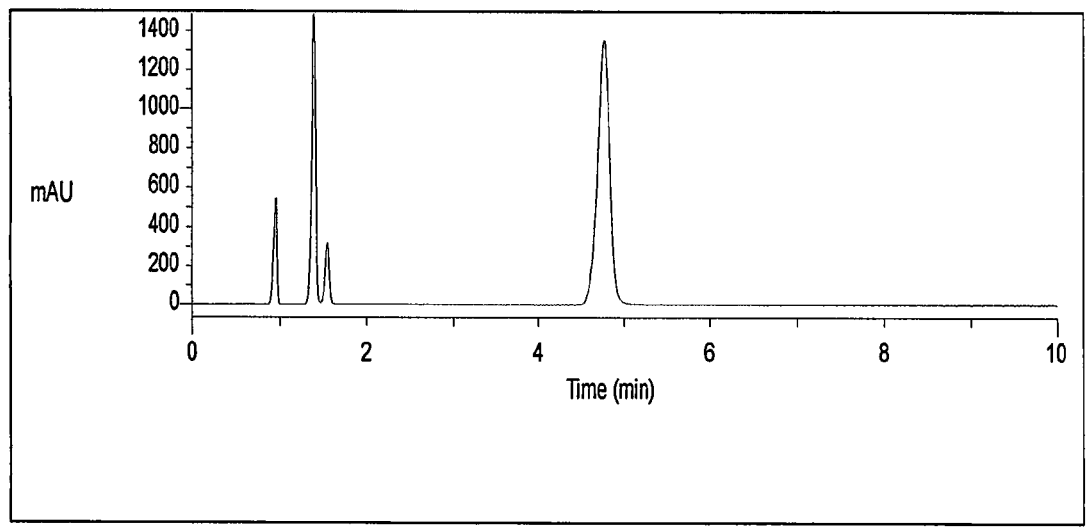

This stationary phase is packed into a column (4.6 mmφ× 150 mm) by the slurry method; examples of the analysis of aromatic hydrocarbons by HPLC and SFC are shown in FIG. 3.

The upper chromatogram in FIG. 3 is HPLC at 25° C. using 1 mL/min of hexane/2-propanol (100:1 v/v). From the left, the peaks are o-terphenyl, m- and p-terphenyl (overlapping), and triphenylene. Detection was carried out by UV at 254 nm.

The lower chromatogram in FIG. 3 is SFC by $CO_2$/methanol (97:3 v/v). It was carried out at flow rate: 4 ml/min, temperature: 40° C., and back pressure: 150 bar. From the left, the peaks are o-terphenyl, m-terphenyl, p-terphenyl, and triphenylene. Detection was carried out by UV at 254 nm.

Example 3

PES Chemical Coating 1.0 g of chlorine-terminated PES (Sumikaexcel 4800P, weight-average molecular weight=42,000) was dissolved in a mixture of 7.2 mL of dichloromethane and 0.8 mL of methanol and this was mixed with 4.0 g of silica gel (average particle diameter=5 μm, pore diameter=700 Å, specific surface area=35 $m^2/g$, treated with aminopropylsilane). The solvent was removed under a reduced pressure to obtain a particulate stationary phase that was not visibly different from that before the supporting process. Since elution of the polymer into the washing solvent and separation of the polymer from the silica gel were not observed, almost the entire amount of the polymer was thought to be supported on the silica gel. The specific surface area of the obtained stationary phase was taken to be 35 $m^2/g$ and its average particle diameter was taken to be 5 μm.

Example 4

1.0 g of the PES as described for Example 3 was dissolved in a mixture of 7.2 mL of dichloromethane and 0.8 mL of methanol and this was mixed with 4.0 g of a spherical, aminopropylsilane-treated silica gel that had an average particle diameter of 5 μm, a pore diameter of 120 Å, and a specific surface area of 320 $m^2/g$. The solvent was similarly removed, and the container was then placed under reduced pressure (5 mmHg) and held for 3 hours at 194° C. The obtained powder was dispersed, filtered, and washed 3 times using a total of approximately 100 mL of a dichloromethane and methanol mixture (9:1 v/v). The carbon content by elemental analysis of the obtained stationary phase was 11.65%. The PES content of the product was calculated at 12.4 mass % from the fact that the carbon content of the silica gel prior to the supporting process was 3.7 mass %. The specific surface area of the obtained stationary phase was taken to be 320 $m^2/g$ and its average particle diameter was taken to be 5 μm.

Production Example 3

7.0 g of silica gel (average particle diameter=5 μm, pore diameter=300 Å, specific surface area=98 $m^2/g$) was dispersed in 200 mL of toluene; a rectification column was installed; and approximately 100 mL of the toluene was removed by distillation while stirring. The silica gel dispersion was cooled to around room temperature, after which 6.18 g of chloromethylphenylethyltrimethoxysilane and 0.33 g of acetic acid were added and 30 mL of toluene was gradually distilled out at a bath temperature of 125° C. After the reaction solution had been cooled, the silica gel was filtered onto a glass filter and was washed 4 times with 30 mL of toluene and 3 times with 40 mL of methanol and then dried under a vacuum.

Example 5

5.0 g of a phenol-terminated PES (Sumikaexcel 5003PS, weight-average molecular weight=45,500) was dissolved in 40 mL of dry DMSO under a nitrogen atmosphere and 56 mg of potassium tertiary-butoxide was added. To 15 g of this solution were added 40 mg of tetrabutylammonium iodide and 2.3 g of the silica gel of Production Example 3, and holding was carried out at 100° C. for 9 hours while stirring. After cooling, the silica gel was collected from the dispersion by filtration on a glass filter and was washed 5 times with 30 mL of DMSO, 3 times with 30 mL of dichloromethane-methanol (9:1 v/v), and finally 5 times with 30 mL of methanol and dried under a vacuum. The carbon content of the obtained stationary phase was 2.56 mass %, and the PES content in the product was calculated at 1.18 mass % from the fact that the carbon content of the chloromethylphenylethyl-silane-treated silica gel was 1.85 mass %. The specific surface area of the obtained stationary phase was taken to be 98 $m^2/g$ and its average particle diameter was taken to be 5 μm.

Example 6

0.258 g of a polysulfone (UDEL P1700 NT11, weight-average molecular weight Mw=47,000) was dissolved in 5.0 mL of THF, and this solution was divided to twice carry out absorption to 2.3 g of silica gel (particle diameter=5 μm, pore diameter=700 Å, specific surface area=35 m2/g, treated with aminopropylsilane) and removal of the solvent by distillation under reduced pressure, thereby obtaining a stationary phase that was not visibly different from that before the process. Since elution of the polymer into the washing solvent and separation of the polymer from the silica gel were not observed, almost the entire amount of the polymer was thought to be supported on the silica gel. The specific surface area of the obtained stationary phase was taken to be 35 m$^2$/g and its average particle diameter was taken to be 5 μm.

Example 7

0.5185 g of a polycarbonate (L1225Y from Teijin Limited) was dissolved in 10 mL of dichloromethane, and this solution was divided to twice repetitively carry out absorption to 2.0 g of silica gel (particle diameter=5 μm, pore diameter=700 Å, specific surface area=35 m$^2$/g, treated with aminopropylsilane) and removal of the solvent by distillation under reduced pressure. A particulate stationary phase that contained some aggregates was finally obtained. Since elution of the polymer into the washing solvent and separation of the polymer from the silica gel were not observed, almost the entire amount of the polymer was thought to be supported on the silica gel. The specific surface area of the obtained stationary phase was taken to be 35 m$^2$/g and its average particle diameter was taken to be 5 μm.

Example 8

1.25 g of PBT (Duranex 300 FP) was dissolved in 7 mL of hexafluoro-2-propanol. To this was added 2.3 g of a silica gel (aminopropylsilane-treated silica gel with an average particle diameter of approximately 5 μm and a pore diameter of 120, 300, or 700 Å (specific surface area=320 m$^2$/g, 98 m$^2$/g, and 35 m$^2$/g, respectively) and trimethylsilane-treated silica gel with an average particle diameter of approximately 5 μm, a pore diameter of 300 Å, and a specific surface area of 98 m$^2$/g (or a total of 4 silica gels)) with mixing followed by removal of the solvent by distillation under a reduced pressure. The silica gel was a powder in each case; there was no visible difference from prior to coating with the PBT; and the specific surface area and average particle diameter were also taken to be the same. Since elution of the polymer into the washing solvent and separation of the polymer from the silica gels were not observed, almost the entire amount of the polymer was thought to be supported on the silica gels.

Figure 4:
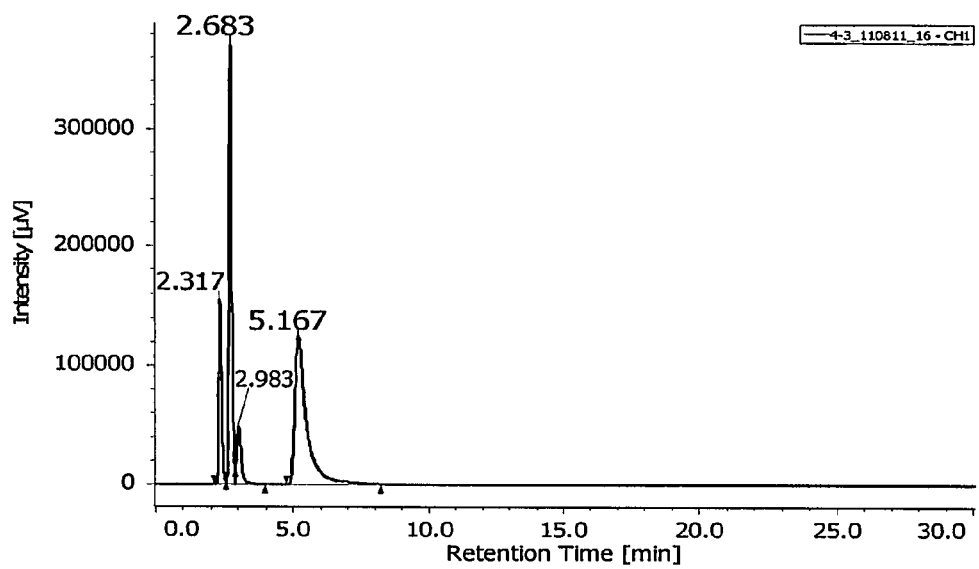
FIG. 4 contains chromatograms obtained using the stationary phase of Example 8, where the upper diagram shows the results for HPLC carried out using the conditions of 25° C. and 1 mL/min hexane/2-propanol (100:1 v/v) and the lower diagram shows the results for SFC carried out with $CO_2$/methanol (97:3 v/v)
Figure 4:
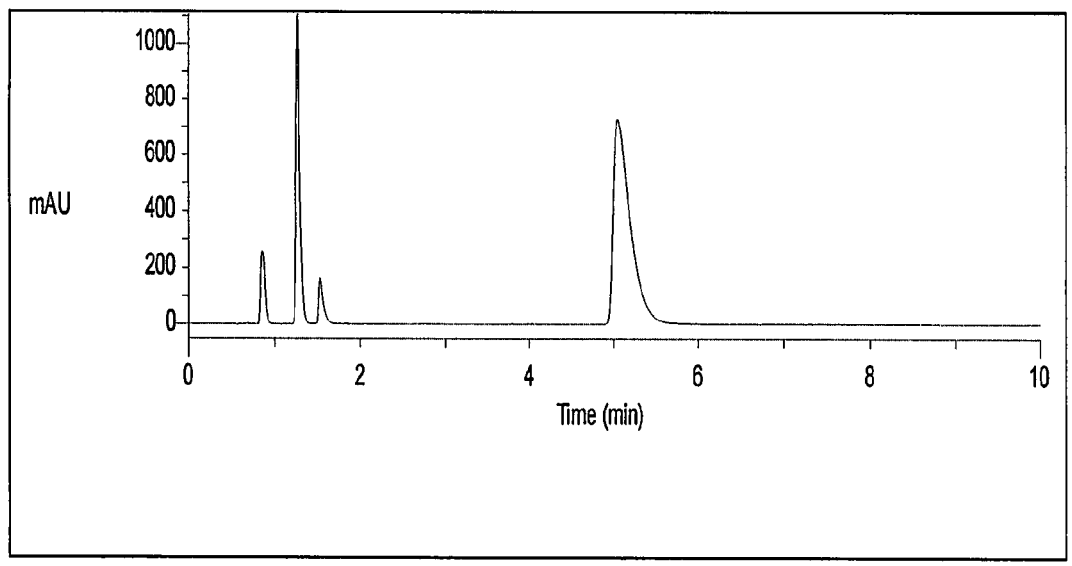

Each of these silica gels was dispersed in ethanol and packed in a stainless steel column having a length of 150 mm and an internal diameter of 4.6 mm. FIG. 4 gives an example of separation by HPLC and SFC on the stationary phase prepared using the aminopropylsilane-treated silica gel with a pore diameter of 700 Å.

The upper chromatogram in FIG. 4 is HPLC at 25° C. using 1 mL/min of hexane/2-propanol (100:1 v/v). From the left, the peaks are o-terphenyl, m-terphenyl, p-terphenyl, and triphenylene. Detection was carried out by UV at 254 nm.

The lower chromatogram in FIG. 4 is SFC by CO$_2$/methanol (97:3 v/v). It was carried out at flow rate: 4 mL/min, temperature: 40° C., and back pressure: 150 bar. From the left, the peaks are o-terphenyl, m-terphenyl, p-terphenyl, and triphenylene. Detection was carried out by UV at 254 nm.

Example 9

Operating as in Example 8, 1.02 g of PBT was dissolved in 7.0 mL of hexafluoro-2-propanol and was supported on 3 g of silica gel (particle diameter=5 μm, pore diameter=300 Å, treated with aminopropylsilane). The obtained powder was gradually heated in a flask under a vacuum of 5 Torr and was held for 3 hours at 198° C. This was followed by cooling, and the following process was carried out 4 times: dispersion for 30 minutes in 30 mL of hexafluoro-2-propanol and filtration. Washing with 30 mL methanol was additionally carried out 3 times followed by vacuum drying. The carbon content in the obtained powder was 17.27 mass %, and a PBT content in the product of 24.9 mass % was calculated from the fact that the carbon content in the aminopropylsilane-treated silica gel was 1.3 mass %. The specific surface area of the obtained stationary phase was taken to be 98 m$^2$/g and its average particle diameter was taken to be 5 μm.

Figure 5:
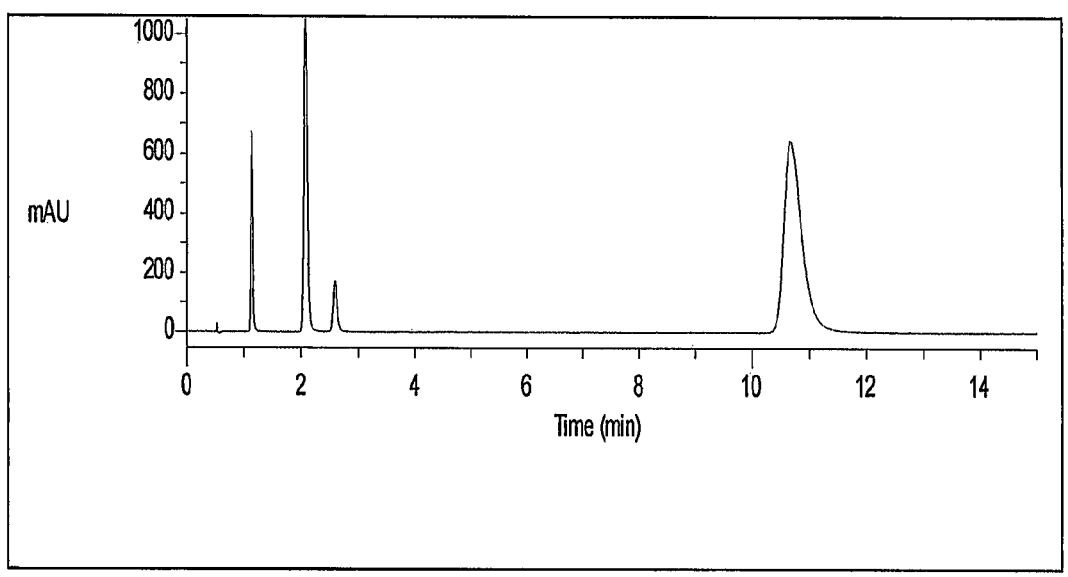
FIG. 5 is a chromatogram obtained using the stationary phase of Example 9.

FIG. 5 shows a chromatogram obtained with the obtained stationary phase packed into a column as described in Example 2.

FIG. 5 is SFC by CO$_2$/methanol (97:3 v/v). It was carried out at flow rate: 4 mL/min, temperature: 40° C., and back pressure: 150 bar. From the left, the peaks are o-terphenyl, m-terphenyl, p-terphenyl, and triphenylene. Detection was carried out by UV at 254 nm.

Example 10

0.5 g of PET (TR8550FF from Teijin Limited) was dissolved in 8 mL of hexafluoro-2-propanol, and the obtained solution was divided to twice carry out support onto 2.06 g of silica gel (particle diameter=5 μm, pore diameter=700 Å, treated with aminopropylsilane) in the same manner as in Example 8. Since elution of the polymer into the washing solvent and separation of the polymer from the silica gel were not observed, almost the entire amount of the polymer was thought to be supported on the silica gel. The specific surface area of the obtained stationary phase was taken to be 35 m$^2$/g and its average particle diameter was taken to be 5 μm.

Figure 6:
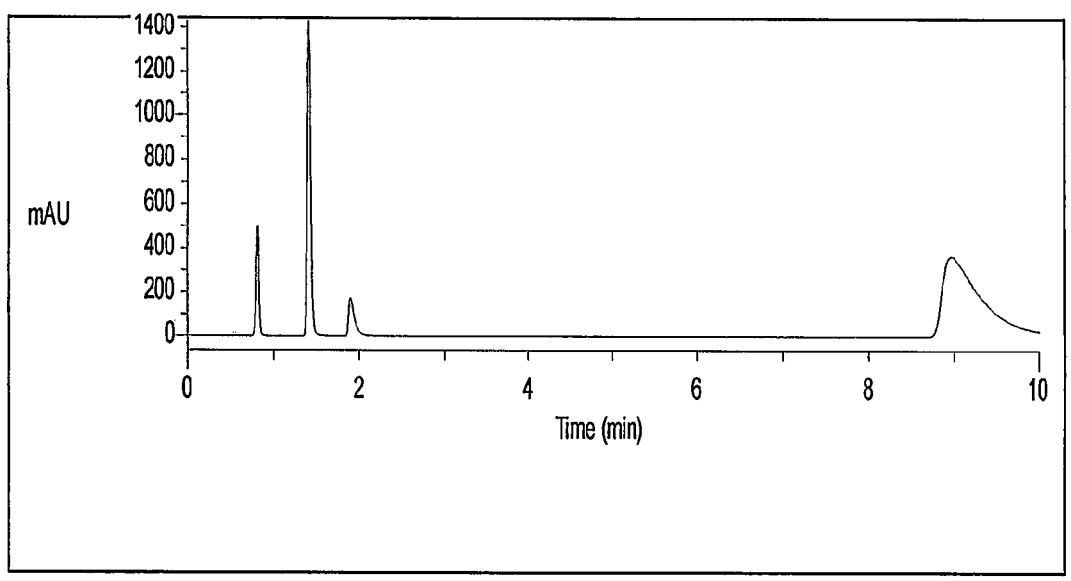
FIG. 6 is a chromatogram obtained using the stationary phase of Example 10.

FIG. 6 shows an example of SFC carried out using a column packed with the obtained stationary phase.

FIG. 6 is SFC by CO$_2$/methanol (97:3 v/v). It was carried out at flow rate: 4 mL/min, temperature: 40° C., and back pressure: 150 bar. From the left, the peaks are o-terphenyl, m-terphenyl, p-terphenyl, and triphenylene. Detection was carried out by UV at 254 nm.

Reference Example

Figure 7:
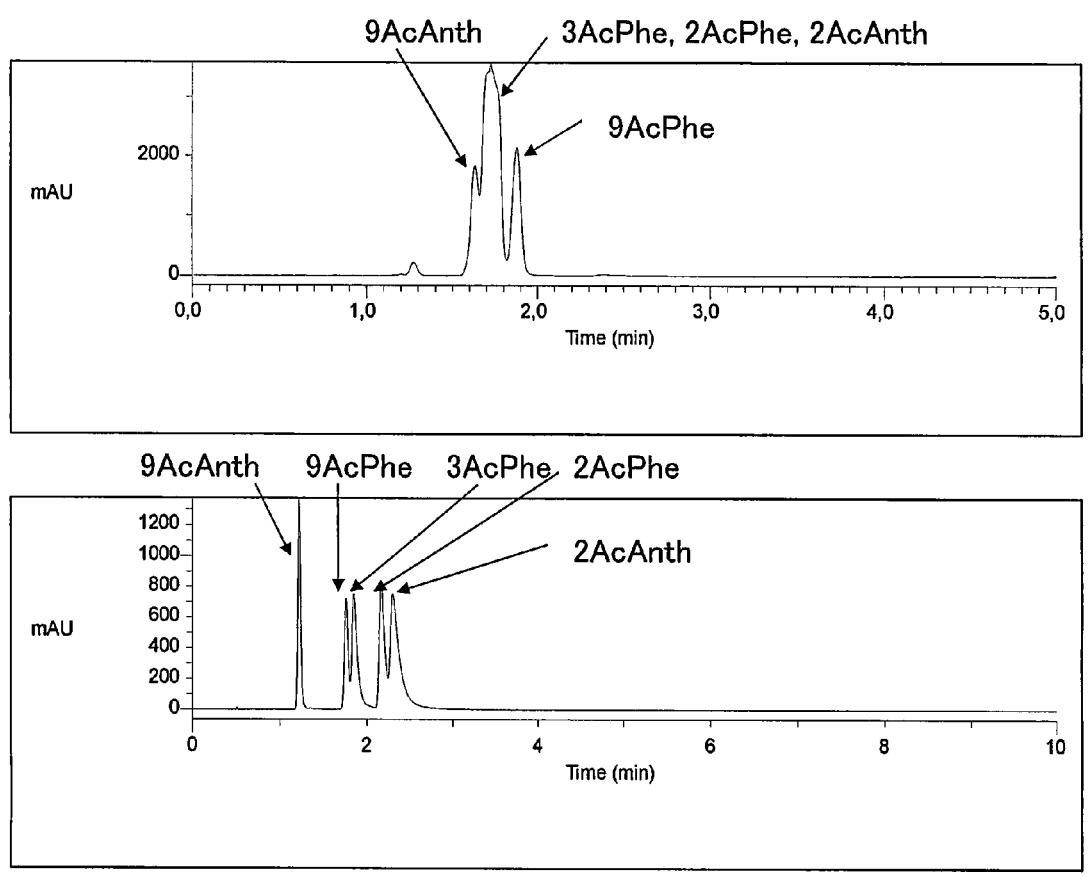
FIG. 7 is a diagram that shows a comparison of separation by a 2-ethylpyridine separation agent and a stationary phase according to the present invention.

FIG. 7 shows an example in which separation on a stationary phase of the present invention is compared with separation on a 2-ethylpyridine separation agent, which has entered into general use for SFC. The SFC separation of acetyl-substituted anthracenes and phenanthrenes was evaluated for a column (0.46 mmφ×15 cm in each case) packed with Viridis Silica 2-Ethylpyridine 5 μm from Waters (upper chromatogram) and a column packed with the stationary phase of Example 10 (lower chromatogram). The SFC was carried out as follows: moving phase:CO$_2$-methanol (9:1 v/v), flow rate: 4.0 mL/min, temperature: 40° C., and back pressure: 150 bar. The abbreviations show the assignments, wherein the beginning numbers show the position of the substituent and Ac=acetyl, Phe=phenanthrene, and Anth=anthracene.

As is clear, the stationary phase of the present invention exhibits a better separation performance for substitutional isomers with similar structures than does 2-ethylpyridine. It is thought that, because the polymer that incorporates aromatic rings and bipolar atomic groups provides a regular arrangement to a certain degree, an adsorption field sensitive to molecular shape is formed.

Production Example 4

Polyethylene Isophthalate 3.320 g of isophthaloyl chloride, 0.152 g of tosyl chloride, and 20 mL of dry pyridine were introduced into a three-neck flask and the headspace was ventilated with nitrogen. While stirring this, a mixture of 1.240 g of ethylene glycol and 10 mL of dry pyridine was added dropwise over a time of 30 minutes from a dropping funnel. After standing for 1 hour, heating at 60° C. for 30 minutes was performed. The reaction solution was cooled followed by pouring into 200 mL of water while stirring. The resulting white precipitate was collected by filtration on a glass filter and was again dispersed in 200 mL of water followed by filtration. It was washed 3 times with 100 mL of methanol each time and was then vacuum dried to obtain 2.8 g of product in the form of a white powder.

Example 11

Proceeding as in Example 8, the product obtained in Production Example 4 was dissolved in hexafluoro-2-propanol and supported on trimethylsilane-treated silica gel with a pore diameter of 120 Å. The specific surface area of the obtained stationary phase was taken to be 320 $m^2/g$ and its average particle size was taken to be 5 μm.

The obtained stationary phase was packed in a column having an internal diameter of 4.6 mm and a length of 150 mm. When SFC was then carried out (the conditions were the same as in Example 10), the o-terphenyl, m-terphenyl, p-terphenyl, and triphenylene eluted at 1.15 minutes, 1.83 minutes, 1.95 minutes, and 7.61 minutes, respectively, and an excellent separation was obtained except for the m- and p-terphenyl isomers.

Production Example 5

Poly(2,2-dimethylpropan-1,3-diyl terephthalate)

1.258 g of 2,2-dimethylpropane-1,3-diol, 2.452 g of terephthaloyl chloride, and 33 mg of tosyl chloride were introduced into a pear-shaped recovery flask and the headspace was substituted by dry nitrogen. This was followed by the addition of 25 mL of dry pyridine and holding for 2 hours at each of 60° C., 80° C., and 100° C. while stirring. After the reaction solution had cooled, it was poured onto about 300 g of crushed ice, which produced a white precipitate. This was washed on a glass filter 3 times with 100 mL of water each time and additionally 3 times with 80 mL of methanol each time, and was then vacuum dried to obtain 2.72 g of a white powder. The entire amount was dissolved in 15 mL of dichloromethane, and this was added into 100 mL of 2-propanol to carry out reprecipitation, which produced a chewing gum-like precipitate. This gradually solidified into a brittle mass. 2.21 g of a powder was obtained by vacuum drying.

Example 12

Proceeding as in Example 11, the product obtained in Production Example 5 was supported using dichloromethane on trimethylsilane-treated silica gel that had a pore diameter of 120 Å. The specific surface area of the obtained stationary phase was taken to be 320 $m^2/g$ and its average particle size was taken to be 5 μm.

The obtained stationary phase was packed in a column having an internal diameter of 4.6 mm and a length of 150 mm, and monoacetyl-substituted anthracenes and phenanthrenes were then analyzed under HPLC conditions (25° C., 1.0 mL/min of hexane/2-propanol 90:10 (v/v)): the 9-acetylanthracene eluted at 4.5 minutes; the 9-acetylphenanthrene eluted at 5.8 minutes; the 3-acetylphenanthrene eluted at 6.4 minutes; and the 2-acetylanthracene and 2-acetylphenanthrene eluted overlapped at 8.3 minutes.

EXPLANATION OF REFERENCE NUMERALS

9AcAnth 9-acetylanthracene
9AcPhe 9-acetylphenanthrene
3AcPhe 3-acetylphenanthrene
2AcPhe 2-acetylphenanthrene
2AcAnth 2-acetylanthracene

The invention claimed is:

1. A stationary phase comprising a polymer having, in main chain repeat units, an aromatic ring that forms a portion of the main chain and a bipolar atomic group that forms a portion of the main chain, wherein
the stationary phase has a specific surface area of 5 to 1000 $m^2/g$ and the polymer is supported on a carrier that has a specific surface area of 5 to 1000 $m^2/g$.

2. The stationary phase according to claim 1, wherein the polymer is a polyester, a polysulfone, a polyethersulfone, or a polycarbonate.

3. The stationary phase according to claim 2, wherein the polymer is a polyester.

4. The stationary phase according to claim 3, wherein the polyester is polyethylene terephthalate (PET), polybutylene terephthalate (PBT), polyethylene isophthalate, poly(2,2-dimethylpropan-1,3-diyl terephthalate), or poly-4-oxymethylbenzoyl.

5. The stationary phase according to claim 1, which is a particulate.

6. The stationary phase according to claim 5, wherein the average particle diameter is 0.1 μm or 1000 μm.

7. The stationary phase according to claim 1, which is a monolith.

8. The stationary phase according to claim 1, which is for supercritical fluid chromatography.

* * * * *